United States Patent [19]
Watanabe

[11] Patent Number: 5,751,502
[45] Date of Patent: May 12, 1998

[54] LENS BARREL WITH BUILT-IN ULTRASONIC MOTOR

[75] Inventor: Tsuneo Watanabe, Tokyo, Japan

[73] Assignee: Nikon Corporation, Tokyo, Japan

[21] Appl. No.: 783,040

[22] Filed: Jan. 14, 1997

[30] Foreign Application Priority Data

Jan. 30, 1996 [JP] Japan .................................. 8-013550

[51] Int. Cl.$^6$ .................................................. G02B 7/02
[52] U.S. Cl. ............................ 359/823; 359/694; 359/696
[58] Field of Search .................................. 359/808, 694, 359/696, 695, 699, 700, 823, 824

[56] References Cited

U.S. PATENT DOCUMENTS

| | | | |
|---|---|---|---|
| 5,335,115 | 8/1994 | Kawai et al. | 359/696 |
| 5,418,650 | 5/1995 | Imanari et al. | 359/823 |
| 5,453,807 | 9/1995 | Iizuka | 359/823 |
| 5,546,233 | 8/1996 | Imanari et al. | 359/696 |
| 5,663,842 | 9/1997 | Takayama et al. | 359/823 |

FOREIGN PATENT DOCUMENTS 4-343310  11/1992  Japan .

*Primary Examiner*—Loha Ben

[57] ABSTRACT

An ultrasonic motor built-in lens barrel includes a focusing optical system, a fixed barrel, and an ultrasonic motor having a stator so fitted to the fixed barrel as to be rotatable about an optical axis and capable of generating ultrasonic vibrations therein, and a rotor coming into a frictional contact with the stator and rotating about the optical axis with the ultrasonic vibrations to thereby enable the focusing optical system to move. The lens barrel also includes a motor drive controller for controlling a drive of the ultrasonic motor, a manual operating portion capable of moving the focusing optical system by an external operation, and a mode selecting portion capable of selecting an autofocusing mode for moving the focusing optical system by the ultrasonic motor, and a manual focusing mode for moving the focusing optical system. The lens barrel further includes an angle-of-rotation reduction mechanism for reducing an angle of rotation of the manual operating portion down to an angle of rotation of the stator of the ultrasonic motor. The same mechanism has a plurality of rotatable members rolling on a side surface of the fixed drum, and a biasing member for pushing the manual operating portion against a side surface of the fixed barrel through these rotatable members and thus causing frictional contacts therebetween.

7 Claims, 4 Drawing Sheets

LENS BARREL WITH BUILT-IN ULTRASONIC MOTOR

BACKGROUND OF THE INVENTION

1. Field of the Invention

The present invention relates a lens barrel with a built-in ultrasonic motor in which a photographing lens is moved by use of an ultrasonic motor.

2. Related Background Art

Known as this type of prior art lens barrel with a built-in ultrasonic motor is a lens barrel in which, a stator of an ultrasonic motor and a manual operation member are so integrally joined as to be rotatable about a fixed drum, and a mode selection member for selecting a manual focusing mode and an autofocusing mode involves the use of only an electric switch. In this lens barrel, when the mode selection member selects the manual focusing mode, a rotor of the ultrasonic motor is made integral with the stator, and rotates interlocked with a manual operation of the manual operation member, thereby moving a focusing optical system. Further, when the autofocusing mode is selected, the stator remains fixed to the fixed drum, and the focusing optical system moves with the rotation of the rotor. Therefore, when in the manual focusing mode, the focusing optical system can be moved without causing any damages to a contact surface between the rotor and the stator of the ultrasonic motor.

FIG. 2 is a sectional view illustrating an example of the prior art (e.g., Japanese Patent Application Laid-Open No. 4-343310) of the lens barrel with a built-in ultrasonic motor. FIG. 3 is a cross-sectional view illustrating a power supply unit shown in FIG. 2. FIG. 4 is a schematic block diagram of the lens barrel in the example of the prior art.

FIG. 2 shows a state of the autofocusing mode wherein focusing optical systems L2, L3 are moved by a rotating force of an ultrasonic motor Mo, and a mode changeover switch 20 is set to the autofocusing mode.

The focusing optical systems L2, L3 are held by a lens holding drum 2 and moved in an optical-axis direction, whereby the focusing operation is performed. The lens holding drum 2 is to fitted to an inner periphery of a central intermediate-diameter portion 1a of a fixed barrel 1 as to be movable in the optical-axis direction. A pin 3 is embedded into an outer peripheral portion of the lens holding drum 2. The pin 3 penetrates a guide groove parallel to the optical axis, which is formed in the central intermediate-diameter portion 1a of the fixed barrel 1, and a tip of the pin 3 engages with a cam groove 4a formed in an inner peripheral surface of a cam ring 4.

The cam ring 4 is fitted to an outer peripheral portion of the central intermediate-diameter portion 1a of the fixed barrel 1, and a pin 5 embedded in the outer peripheral portion of the central intermediate-diameter portion 1a engages with a circumferential groove 4b formed on an inner peripheral surface of the cam ring 4. As a result, this cam ring 4 is unmovable in the optical-axis direction but rotatable only through a predetermined angle about the optical axis. Also, a distance scale is indicated on a rightward large-diameter outer peripheral portion 4c of the cam ring 4.

A stator 6 of the ultrasonic motor Mo is so fitted to an outer peripheral portion of a central small-diameter portion 1c of the fixed barrel 1 as to be rotatable about the optical axis.

A window member 8 is provided in a large-diameter portion 1d of the fixed barrel 1 and is formed of a transparent synthetic resin. It is possible to read the distance scale from outside that is indicated on the rightward large-diameter outer peripheral portion 4c of the cam ring 4 through this window member 8 and an intermediate ring 7 composed of the transparent synthetic resin.

The rotator 9 is in a frictional contact with the stator 6 and is so provided as to be rotatable about the stator through a bearing 12. An engagement groove 9a is formed in a left part of the rotor 9 and engages with an engagement protrusion 4d provided on the rightward large-diameter inner peripheral portion of the cam ring 4. Therefore, the rotor 9 and the cam ring 4 rotate integrally in the rotating direction. Further, a biasing member 14 brings the stator 6 and the rotor 9 in the frictional contact state through a disk 13.

A manual operation ring 10 is fitted respectively to the large-diameter portion 1d and a leftward large-diameter portion 1e of the fixed barrel 1. The manual operation ring 10 is unmovable in the optical axis and is so provided as to be rotatable about the optical axis direction. The intermediate ring 7 composed of the transparent synthetic resin is rotatably provided on an inner peripheral portion of the manual operation ring 10.

A glass epoxy plate 15 is fixed to the stator 6 and has conductor portions 15a that are, as illustrated in FIG. 3, provided in an annular shape over the entire periphery thereof. Therefore, a brush 16 slides on the conductor portions 15a and is thus capable of being electrically connected to the stator 6 at any angular positions of the stator 6. Note that the glass epoxy plate 15 is formed with through-holes 15b in positions off the annular conductor portions on which the brush 16 slides. The conductor portions 15a are led via the through-holes 15b to a conductor on the underside of the glass epoxy plate 15, and the conductor on the underside thereof is electrically connected to the stator 6.

A presser plate 17 is a plate for fixing the brush 16 to a brush fixing plate 16. The brush fixing plate 18 is fixed to the fixed barrel 1 with screws 19.

The mode changeover switch 20 is slidably provided on the fixed barrel 1. The mode changeover switch 20 is constructed so that when slid in an M-direction in FIG. 2, the manual focusing mode is set, and, when slid in an A-direction, the autofocusing mode is set. The switch 20 is also constructed to generate electric signals corresponding to the respective modes.

A switchover plate 21 is fixed to the mode changeover switch 20 with screw 23. A plate spring 22 is fixed to the fixed barrel 1 with screw 24. The plate spring 22 is capable of engaging with and disengaging from a plurality of engagement grooves 6a formed on an outer peripheral portion of the stator 6.

When the mode changeover switch 20 is slid in the M-direction, i.e., when in the manual focusing mode, the switchover plate 21 simultaneously moves, and the plate spring 22 is pushed up as indicated by a dotted line in FIG. 2, with the result that the plate spring 22 is disengaged from the engagement grooves 6a. In a state where the plate spring 22 is disengaged from the engagement grooves 6a of the stator 6, the manual operation ring 10 gets rotatable.

When the mode changeover switch 20 is slid in the A-direction, i.e., when changed over from the manual focusing mode to the autofocusing mode, the switchover plate 21 simultaneously moves, and the plate spring 22, as indicated by a solid line in FIG. 2, reverts to the initial state. Then, the plate spring 22 engages with the engagement grooves 6a of the stator 6, thus hindering the rotation of the manual operation ring 10.

Note that a condition of C<B<A is satisfied, where A is the frictional torque between the stator 6 and the rotor 9, B is the frictional torque between the fixed barrel 1 and the stator 6, and C is the torque needed for driving the lens holding drum 2.

(Explanation of Autofocusing Mode)

Next, an operation of the prior art lens barrel will be explained with reference to FIG. 2.

When in the autofocusing mode, the mode changeover switch 20 is in the position A, and the plate spring 22 engages with the engagement grooves 6a of the stator 6 as shown by the solid line in FIG. 2. Hence, the rotation of the manual operation ring 10 is hindered enough to make the stator 6 unable to rotate.

Herein, an unillustrated control mechanism (corresponding to a power supply portion 100 in FIG. 4) supplies the ultrasonic motor Mo with the electric power, and, hereupon, surficial traveling waves are generated on the stator 6, whereby the rotor 9 rotates in the circumferential direction. When the rotor 9 rotates, since the engagement protrusion provided on the cam ring 4 is in engagement with the leftward engagement groove 9a of the rotor 9, the rotor 9 and the cam ring 4 integrally rotate. Then, when the cam ring 4 rotates, the lens holding drum 2 moves along the optical axis, thus executing the autofocusing.

(Explanation of Manual Focusing Mode)

When in the manual focusing mode, the mode changeover switch 20 is slid in the M-direction in FIG. 2. The supply of the electric power to the ultrasonic motor Mo is thereby cut off.

When the mode changeover switch 20 is slid in the M-direction, the switchover plate 21 fixed to the mode changeover switch 20 also simultaneously moves, and the plate spring 22 fixed to the fixed barrel 1 is raised and thereby disengaged from the engagement groove 6a formed in the outer peripheral portion of the stator 6.

In the disengaged state of the plate spring 22 from the engagement groove 6a, the manual operation ring 10 is rotatable. Besides, since the supply of the electric power to the ultrasonic motor Mo is cut off, the ultrasonic motor Mo is not driven, and the stator 6 and the rotor 9 are in such a state as to be forcibly pushed by the biasing member 14.

Further, there is satisfied a condition of C<A with respect to the torque C needed for moving the lens holding drum 2 and the frictional torque A between the stator 6 and the rotor 9. Hence, when rotating the manual operation ring 10, it follows that the stator 6 and rotor 9 rotate integrally through the intermediate ring 7.

When the rotor 9 rotates, as the engagement groove 9a at the left edge of the rotor 9 engages with the engagement protrusion 4d provided on the cam ring 4, the rotor 9 and the cam ring 4 integrally rotate. When the cam ring 4 rotates, the lens holding drum 2 moves in the optical-axis direction, thus effecting the manual focusing.

According to the prior art, when in the autofocusing mode, the mode changeover switch 20 is in the position A, and, as illustrated in FIG. 2, the plate spring 22 is in engagement with the engagement groove 6a formed in the outer peripheral portion of the stator 6. Consequently, the rotation of the manual operation ring 10 is hindered, and the stator 6 is also in the state where the stator can not be rotated.

However, even if the spring plate 22 does not engage with the engagement groove 6a, there is met a condition of C<B with respect to the frictional torque B between the fixed barrel 1 and the stator 6 and the torque C required for moving the lens holding drum 2. Therefore, when the ultrasonic motor Mo is operated, the stator 6 does not rotate, whereas only the rotor 9 rotates. That is, the autofocusing mode and the manual focusing mode can be simply switched over depending on whether to supply the ultrasonic motor Mo with the electric power.

Accordingly, when performing a go-home photographic function by previously memorizing an arbitrary camera-to-subject distance (hereinafter simply termed a "photographing distance") and moving the lens to this memorized photographing distance after photographing at another photographing distance, and when executing manual focusing mode priority photography for an instantaneous switchover to the manual focusing mode by rotating the manual operation ring during the photography in the autofocusing mode, the mechanical switchover is not needed, and hence it is quite easy to incorporate a mechanism for quickly performing the above function or the mode switchover.

The ultrasonic motor described above has such a feature that characteristics of the output torque and the number of rotations of the rotor are determined substantially by a shape or a size of the motor. For instance, if a motor torque is determined from a requirement for the movement of the focusing optical system, it follows that the number of rotations thereof is automatically determined. Hence, if the motor is designed based on a requirement for a time needed for the focusing optical system to move from a photographing distance ∞ (infinite) position to a closest focusing position, it follows that an angle through which the rotor rotates from a position corresponding to a photographing distance ∞ to a position corresponding to the closest focusing position, is also automatically determined.

On the other hand, in the prior art lens barrel explained above, when the manual focusing mode is selected, the stator and the rotor of the ultrasonic motor get integral, and the rotor rotates interlocked with the manual operation of the manual operation member, thereby moving the focusing optical system. It therefore follows that the angle of a manual operation member necessary for a rotation from the photographing distance ∞ position to the closest focusing position is determined according to the design of the motor as explained above. Consequently, there arises such a problem that if this angle is too small as an angle for performing the manual focusing, the manual focusing based on a fine adjustment becomes impossible.

SUMMARY OF THE INVENTION

It is a primary object of the present invention, which was contrived to obviate the problems described above, to provide a lens barrel with a built-in ultrasonic motor capable of performing manual focusing based on a fine adjustment by making an angle needed for a manual operation member to rotate from a photographing distance ∞ position to a closest focusing position, larger than an angle of rotation of a rotor of an ultrasonic motor, and capable of surely fixing a stator of the ultrasonic motor to a fixed drum of a barrel when autofocusing in order that a mechanism therefor functions more effectively.

According to one aspect of the present invention, an ultrasonic motor built-in lens barrel comprises a focusing optical system, a fixed barrel, and an ultrasonic motor having a stator so fitted to the fixed barrel as to be rotatable about an optical axis and capable of generating ultrasonic vibrations therein, and a rotor coming into the frictional contact with the stator and rotating about the optical axis with the ultrasonic vibrations to thereby enable the focusing optical system to move. The lens barrel also comprises a manual operating portion capable of moving the focusing optical system by an external operation, and a mode selecting portion capable of selecting an autofocusing mode for moving the focusing optical system by the ultrasonic motor, and a manual focusing mode for moving the focusing optical system with the operation of the manual operating portion. When the mode selecting portion selects the manual focusing mode, the rotor and the stator of the ultrasonic motor get integral, and the rotor rotates interlocked with the manual operation of the manual operating portion, thereby moving the focusing optical system. When the autofocusing mode is selected, the stator of the ultrasonic motor is fixed to the fixed barrel, and the focusing optical system is moved with a rotation of the rotor. The lens barrel includes an angle-of-rotation reduction mechanism for transmitting an angle of rotation of the manual operating portion to an angle of rotation of the stator of the ultrasonic motor with the angle of rotation reduced. The angle-of-rotation reduction mechanism has a plurality of small rotatable members rolling on a side surface of the fixed drum, and a biasing member for pushing the manual operating portion against a side surface of the fixed barrel through the small rotatable members and thus causing frictional contacts therebetween. A frictional member is provided on a contact portion of the manual operating portion and/or the fixed barrel with the small rotatable members.

Preferably, the frictional member is an annular rubber sheet and bonded to the contact portion.

Further, the small rotatable member is constructed of a central shaft provided on the stator in a direction orthogonal to the optical axis of the focusing optical system, and resinous rollers rotatably fitted to the central shaft. A frictional portion is formed on an outer peripheral surface brought into contact with the contact portions of the rollers.

Moreover, the frictional portion may be knurled.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

Figure 1:
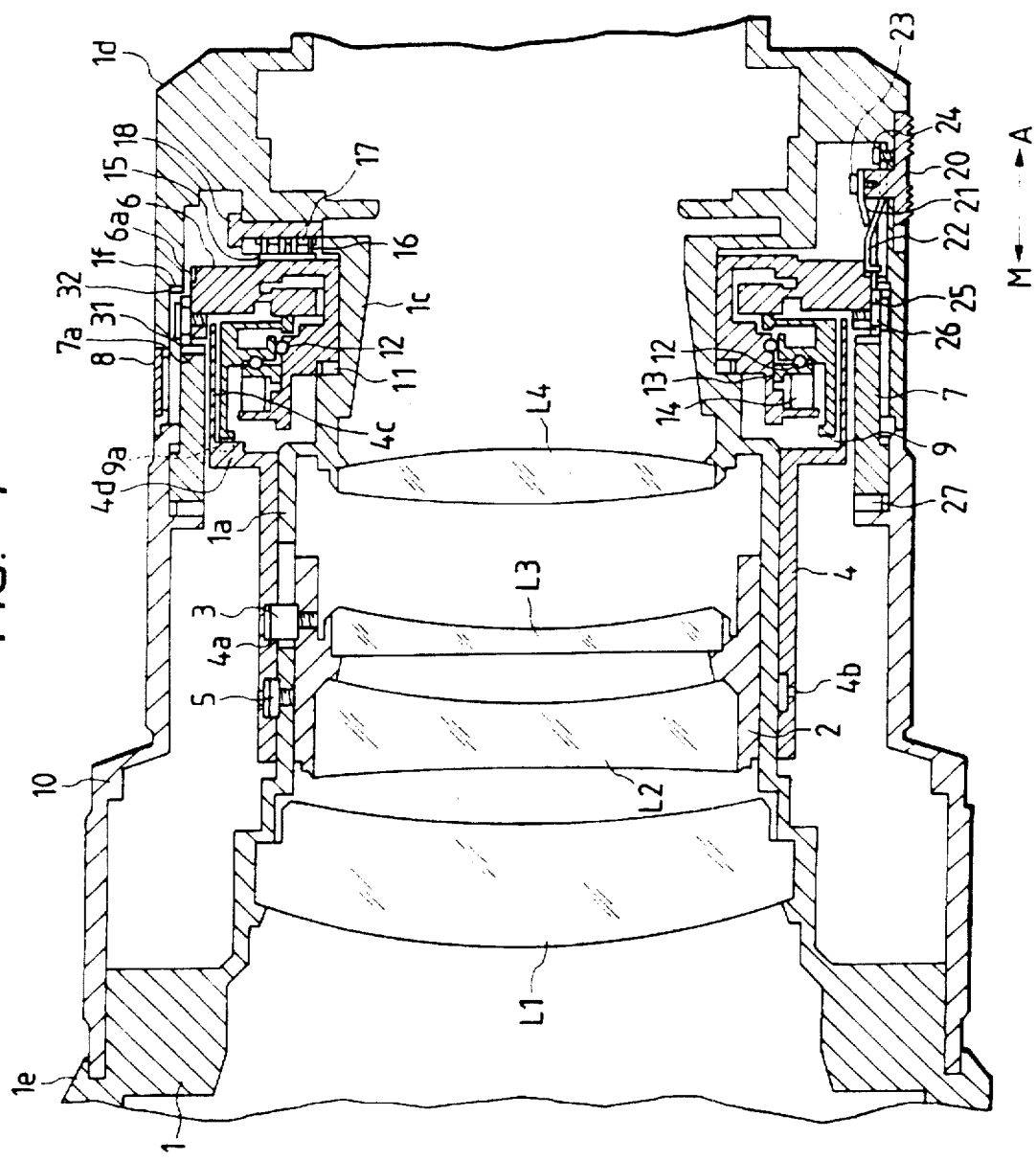
FIG. 1 is a sectional view illustrating an embodiment of a lens barrel with a built-in ultrasonic motor according to the present invention.
Figure 2:
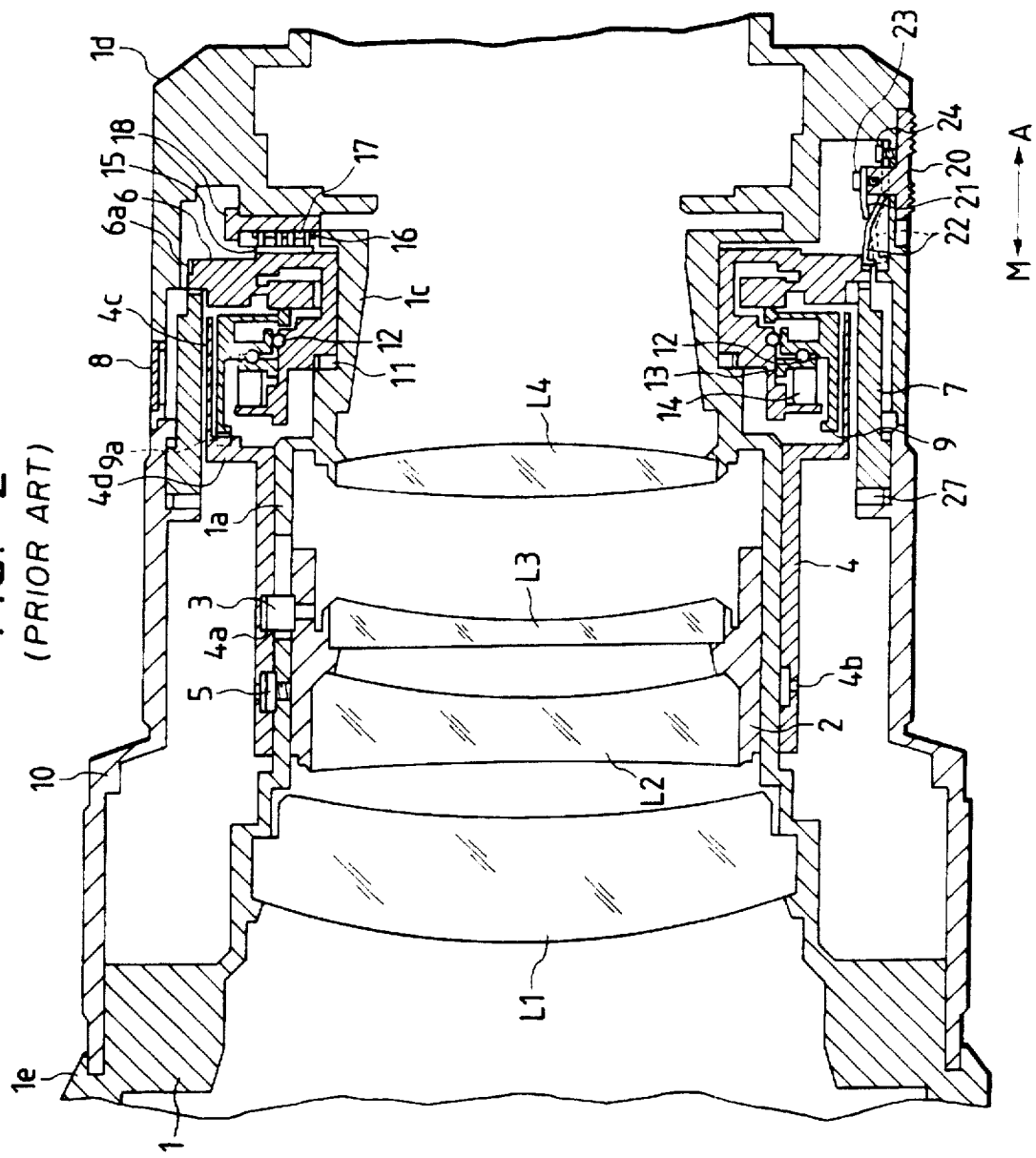
FIG. 2 is a sectional view showing a prior art ultrasonic motor built-in lens barrel.
Figure 3:
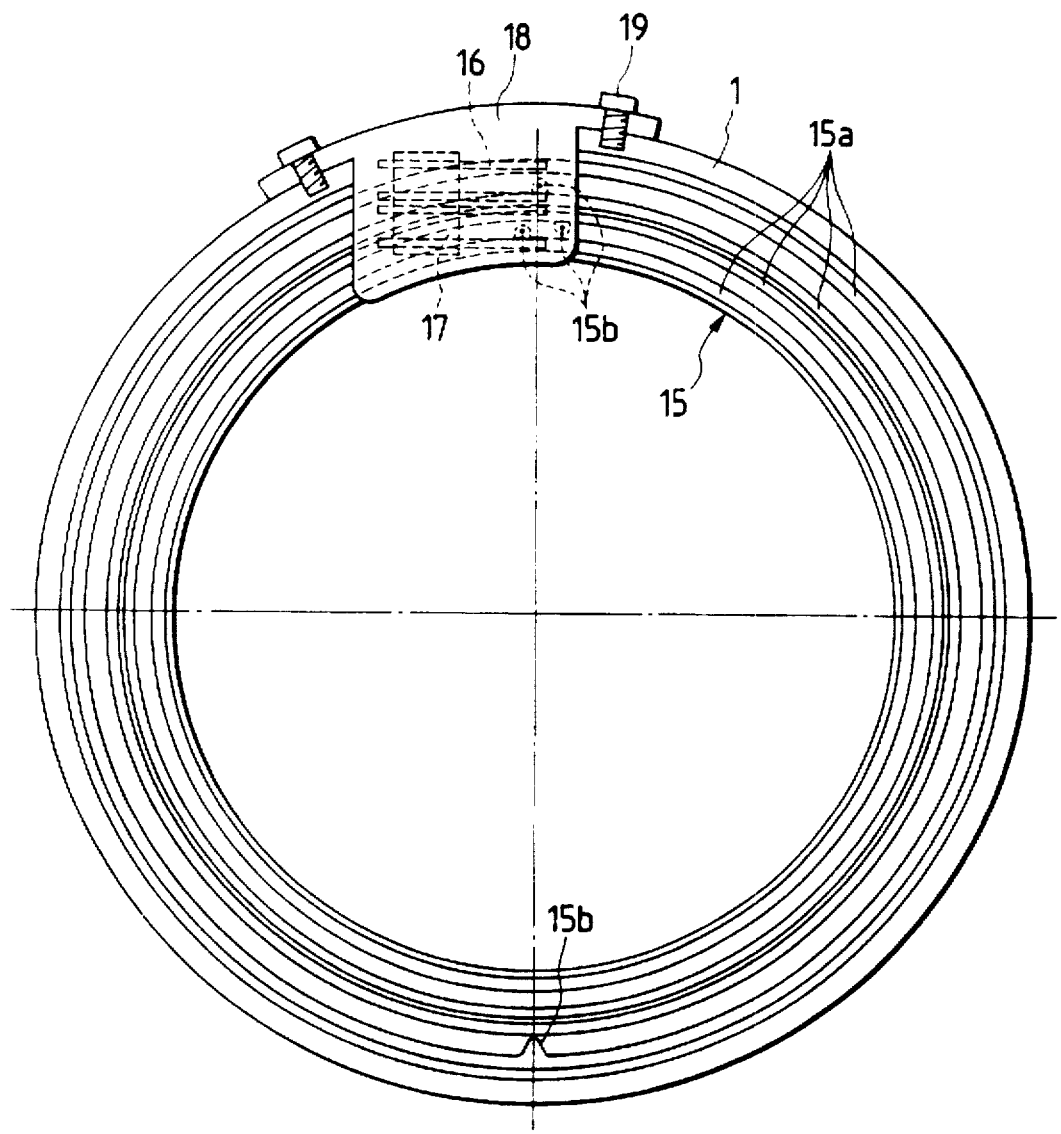
FIG. 3 is a cross-sectional view illustrating a power supply portion in FIG. 2.
Figure 4:
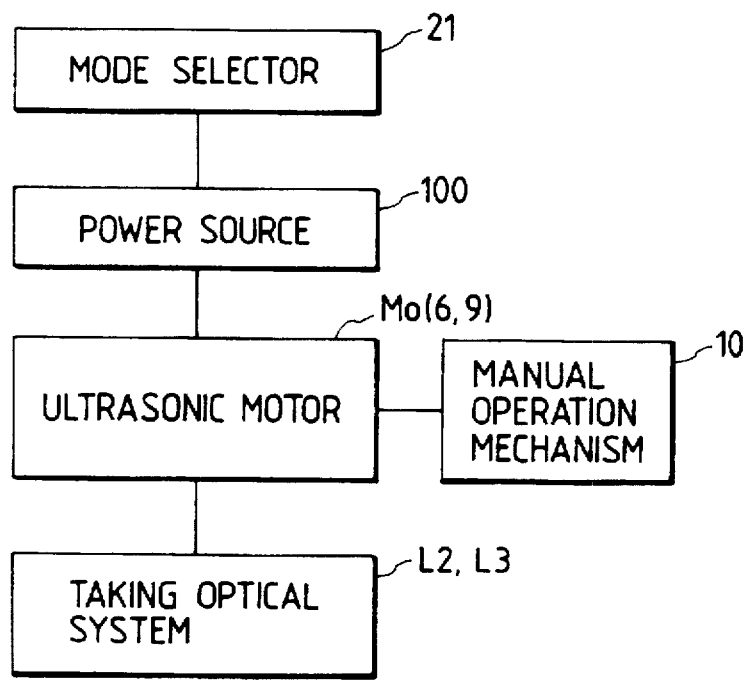
FIG. 4 is a schematic block diagram showing a lens barrel in the prior art.

An embodiment of the present invention will hereinafter be described with reference to the accompanying drawings. FIG. 1 is a sectional view illustrating an embodiment of a lens barrel with a built-in ultrasonic motor according to the present invention. Note that the portions performing the same functions as those in the prior art described above are marked with the like reference numerals, and repetitive explanations are herein omitted.

In accordance with this embodiment, on the outer peripheral surface of a stator 6 (which defined as a stator of an ultrasonic motor) there is provided a plurality of rollers 25 so supported as to be rotatable with respect to a central shaft 26 provided perpendicular to the optical axis. This roller 25 is worked by use of a resinous material (e.g., polyacetal). Further, an outer peripheral surface of the roller 25 is knurled. The central shaft 26 and the rollers 25 constitute the small rotatable member.

A biasing member 11 is provided between a central small-diameter portion 1c of a fixed barrel 1 and a stator 6. The stator 6 is pushed through rollers 25 against a shoulder portion 1f of an inner surface of a large-diameter portion 1d of the fixed barrel 1, thereby providing a predetermined frictional torque so that the stator 6 does not tend to easily rotate in an autofocusing mode.

Also, a biasing member 27 is provided between a manual operation ring 10 and an intermediate ring 7. The intermediate ring 7 is pushed against the shoulder portion 1f of the large-diameter portion 1d of the fixed barrel 1 through the rollers 25 provided on the outer periphery of the stator 6, thereby making the intermediate ring 7 frictionally contact the rollers 25 and making the rollers 25 frictionally contact the fixed barrel 1.

Further, for a more enhancement of the frictional contacts between these three members, annular sheets 31, 32 composed of rubber (e.g., silicon rubber, etc.) are bonded in the circumferential direction respectively to an end surface 7a of the intermediate ring 7 contacting the rollers 25 of the small rotator and to the shoulder portion if of the large-diameter portion 1d of the fixed barrel 1.

When rotating the manual operation ring 10, the stator 6 is thereby rotated about the optical axis on the outer periphery of the central small-diameter portion 1c of the fixed barrel 1 through the intermediate ring 7 and the rollers 25 as well. At this time, an angle of rotation of the stator 6 becomes one-half the angle of rotation of the manual operation ring 10 according to the principle of the planetary gear.

Moreover, when the manual operation ring 10 is further rotated after the cam ring 4 has rotated through a predetermined angle and stopped upon impinging on a rotation restrictor, the manual operation ring 10 and the intermediate ring 7 slid on a contact surface with the biasing member 27, whereby an excessive torque is not applied on the intermediate ring 7 and the following members. Accordingly, internal constructive elements are not carelessly damaged.

In accordance with the embodiment of the present invention, in the lens barrel designed to perform the manual focusing by rotating the stator 6 of the ultrasonic motor, even when enhancing the manual operability by use of an angle-of-rotation reduction mechanism of the manual operation member, it is feasible to certainly fix the stator 6 of the ultrasonic motor to the fixed drum of the barrel during the autofocusing process, and there is no possibility of a decline in terms of accuracy of the autofocusing. Further, even if a greater force than needed is applied, there is no possibility in which the members might be damaged and so forth.

The present invention is not limited to the embodiment discussed above but may be modified and changed in a variety of forms, and these modifications and changes are included in the scope of the present invention.

In the above embodiment of the present invention, when the manual operation ring 10 is further rotated after the cam ring 4 has rotated through the predetermined angle and stopped upon impinging on the rotation restrictor, the manual operation ring 10 and the intermediate ring 7 slid on the contact surface with the biasing member 27, whereby no excessive torque is applied on the intermediate ring 7 and the following members. With the construction as it is, however, a possible arrangement is that the manual operation ring 10 and the intermediate ring 7 get integral, pushed by the biasing member 27 and then slid on the contact surface with the rollers 25.

Moreover, in the embodiment of the present invention, the stator 6 is pushed by the biasing member 11 against the shoulder portion 1f of the large-diameter portion 1d of the fixed barrel 1, thereby providing the predetermined frictional torque so that the stator 6 does not tend to easily rotate during the autofocusing mode. The stator 6 is, however, pushed by the biasing member 27 through the intermediate ring 7 and the rollers 25, and hence the biasing member 11 may be omitted with some contrivance in terms of a balance between the frictional torques of the constructive elements.

Furthermore, the annular rubber sheet is employed as a frictional member, but the frictional member is not confined to the above. Any members are available on condition that the members give proper frictions as in the case of coating it with rubber instead of the above.

As discussed above, the ultrasonic motor built-in lens barrel exhibits effects which follow. The angle required for the manual operation member to rotate from the photographing distance ∞ position to the closest focusing position can be taken larger than the angle of rotation of the rotor of the ultrasonic motor, and therefore the manual focusing based on the fine adjustment is possible. Also, the stator of the ultrasonic motor can be surely fixed to the fixed drum of the barrel when in the autofocusing without deteriorating the accuracy of the autofocusing. Besides, there is no possibility in which the members might be damaged even when the greater force than required is applied.

Further, the frictional member such as rubber or the like is provided on the contact portion with the rollers 25, or the roller is knurled, thereby yielding such an effect that the stator of the ultrasonic motor can be more firmly fixed to the fixed drum of the barrel when in the autofocusing.

What is claimed is:

1. An ultrasonic motor built-in lens barrel comprising:

a photographing optical system;

a fixed barrel;

an ultrasonic motor having a stator so fitted to said fixed barrel as to be rotatable about an optical axis and capable of generating ultrasonic vibrations therein, and a rotor in a frictional contact with said stator and rotating about the optical axis with the ultrasonic vibrations to thereby move said photographing optical system;

a manual operating portion for moving said photographing optical system by a manual operation from outside;

a mode selecting portion for selectively switching over an autofocusing mode for moving said photographing optical system by said ultrasonic motor, under which said stator is fixed to said fixed barrel and only said rotor is driven by a driving force of the ultrasonic motor so as to move said photographing optical system, and a manual focusing mode for moving said photographing optical system by the operation of said manual operating portion, under which said rotor and said stator get integral, and said rotor rotates interlocked with the operation of said manual operating portion to thereby move said photographing optical system;

an angle-of-rotation reduction mechanism for transmitting a rotation of said manual operating portion at a reduced angle of rotation to said stator of said ultrasonic motor when the manual focusing mode is selected, said angle-of-rotation reduction mechanism including a plurality of small rotatable members provided rotatably on said stator, which roll on a side surface of said fixed barrel with the rotation of said manual operating portion, and a biasing member for causing frictional contacts between said manual operating portion and the plurality of small rotatable members and said manual operating portion and between said small rotatable members and said fixed barrel by pushing said manual operating portion against the side surface of said fixed barrel through said small rotatable members; and a frictional member provided on a contact portion of said manual operating portion and/or said fixed barrel.

2. The lens barrel according to claim 1, wherein said frictional member is an annular rubber sheet and bonded to said contact portion.

3. The lens barrel according to claim 1, wherein each of said small rotatable members includes a central shaft extending in a direction orthogonal to the optical axis of said photographing optical system that is provided on said stator, and resinous rollers rotatably fitted to said central shaft, and a frictional portion is formed on an outer peripheral surface brought into contact with said contact portions of said rollers.

4. The lens barrel according to claim 3, wherein said frictional portion is knurled.

5. The lens barrel according to claim 1, wherein said rotor is fixed to a barrel for housing a focusing lens unit of said photographing optical system, and said focusing lens unit performs focusing with a movement in an optical-axis direction with a rotation of said rotor.

6. The lens barrel according to claim 1, further comprising a biasing member for preventing a rotation of said stator when in the autofocusing mode by pushing said stator against said fixed barrel.

7. The lens barrel according to claim 1, wherein a ratio of an angle of rotation of said manual operating portion to an angle of rotation of said stator when in the manual focusing mode is 2 : 1.

* * * * *